Aug. 13, 1963  A. R. D'ALBA  3,100,423
WINDSHIELD WIPER
Filed March 23, 1961  4 Sheets-Sheet 1

INVENTOR.
ANTHONY R. D'ALBA
BY
Bean Brooks Buckley & Bean
ATTORNEYS

Fig. 2

INVENTOR.
ANTHONY R. D'ALBA
BY
Bean Brooks Buckley & Bean
ATTORNEYS

Aug. 13, 1963  A. R. D'ALBA  3,100,423
WINDSHIELD WIPER
Filed March 23, 1961  4 Sheets-Sheet 3

INVENTOR.
ANTHONY R. D'ALBA
BY
Bean Brooks Buckley & Bean
ATTORNEYS

Aug. 13, 1963

A. R. D'ALBA 3,100,423

WINDSHIELD WIPER

Filed March 23, 1961

INVENTOR.
ANTHONY R. D'ALBA
BY
Bean Brooks Buckley & Bean.
ATTORNEYS

3,100,423
WINDSHIELD WIPER
Anthony R. D'Alba, Williamsville, N.Y., assignor to Trico Products Corporation, Buffalo, N.Y.
Filed Mar. 23, 1961, Ser. No. 97,838
8 Claims. (Cl. 91—283)

The present invention relates to an improved hydraulic windshield wiper motor.

It is an important object of the present invention to provide an hydraulic windshield wiper motor having a variable pressure regulator mechanism which automatically causes the motor to operate at pressures which are proportional to its speed. Thus the motor will operate at relatively low hydraulic pressures when it is set to run at relatively low speeds, and will operate at relatively high hydraulic pressures only when it is set for high speed operation. Since the motor is operated predominantly at low speeds, the variable pressure regulator causes the wiper motor to produce a maximum loading on the pump only during the infrequent times when the wiper motor is operated at high speeds. The variable pressure regulator will cause the hydraulic motor to consume an amount of power which is proportional to the speed at which it is operating. Furthermore, the hydraulic fluid conduits and other components of the system will be subjected to relatively low hydraulic pressure most of the time when the wiper motor is in operation, thereby increasing their useful life.

Another object of the present invention is to provide an hydraulic windshield wiper motor which requires relatively few parts in that the variable pressure regulator mechanism, noted above, serves the additional function of a bypass valve when the wiper motor is in an off or parking position and therefore permits hydraulic fluid coming from the pump to bypass the operating parts of the wiper motor, thereby eliminating the requirement for separate bypass valve mechanism for the motor.

A further object of the present invention is to provide a self-contained hydraulic windshield wiper motor which is relatively compact in that the pressure regulating mechanism which automatically provides hydraulic fluid thereto at the required operating pressures and also functions as a bypass valve, as noted above, is incorporated within the housing of the motor itself, thereby obviating the necessity for sparate pressure regulating mechanism externally of the motor. A related object of the present invention is to provide an hydraulic wiper system utilizing relatively few external conduits, the latter being possible because most of the parts of the hydraulic wiper system are incorporated within the wiper motor itself.

A still further object of the present invention is to provide a novel parking arrangement which insures positive movement of the wiper motor to a parking position in a simple and reliable manner.

Yet another object of the present invention is to provide an improved hydraulic motor wherein the pressure regulating mechanism, in addition to serving the above-enumerated function, also serves the additional function of providing the force to return a washer coupling mechanism to a neutral position after a windshield washing operation.

Another object of the present invention is to provide a fluid pressure circuit for an hydraulic windshield wiper motor which is relatively simple. Other objects and attendant advantages of the present invention will readily be perceived hereafter.

The improved hydraulic windshield wiper motor of the present invention includes a housing having a drive piston mounted therein for driving the motor drive shaft. The drive piston divides a portion of the housing into first and second chambers. The housing is in communication with a source of fluid pressure such as an hydraulic pump which drives the power steering apparatus of the vehicle, or any other suitable hydraulic source. A control valve is mounted in the housing and may be manually set in various positions to thereby adjustably meter the amount of hydraulic fluid under pressure flowing to a fluid inlet conduit in the housing to thereby adjust the motor speed. Suitable valving is operable in synchronism with the movement of the drive piston to alternately route high pressure hydraulic fluid from said fluid inlet conduit to said first and second chambers while permitting the fluid in the other of said chambers to be exhausted. This action oscillates the first piston and causes the motor to operate.

The motor housing contains structure for permitting hydraulic fluid to flow through certain portions thereof without driving the motor when the control valve is in an off position, this flow through the motor being at a relatively low pressure and thereby placing a minimum load on the pump. The housing also contains structure which is automatically responsive to the movement of the control valve to a motor operating position for raising the hydraulic pressure from the normally low by-passing value to a value suitable for wiper motor operation and for causing this increased pressure to be proportional to the speed setting of the control valve. The foregoing structure includes a coupler piston, the combined pressure regulating and bypass valve noted above, and a spring mounted therebetween. Before the wiper motor is turned on, it is the combined bypass and pressure relief valve which permits hydraulic fluid to bypass the wiper motor at a relatively low pressure. After the control valve has been moved toward the coupler piston incidental to the starting of the motor, the hydraulic fluid moves the coupler piston toward the pressure relief valve. The foregoing combined movement of the control valve and coupler piston toward each other causes a compression of the spring therebetween, the degree of such compression being determined by the amount of movement of the control valve. It is this degree of spring compression which determines the pressure at which the pressure regulating valve will release to determine the pressure at which the motor will operate, as set forth in detail hereafter.

The combined bypass and pressure regulating valve performs its pressure regulating function primarily during reversal of drive piston movement because at this time the flow of hydraulic fluid to the inlet conduit leading to the chambers in which the piston operates is reduced, this causing the pressure in the conduits leading from the pump to build up. The foregoing flow is reduced primarily because of the automatic operation of dampening mechanism which restricts the flow of hydraulic fluid into the motor at the end travel of the drive piston. When the pressure builds up sufficiently to produce a force which will unseat the pressure regulating valve against the bias of the above-mentioned spring, the valve will open and permit hydraulic fluid to pass into an exhaust conduit leading to the reservoir. After piston reversal, the pressure in the inlet conduit of the motor will drop as the dampening mechanism permits more flow into the motor and the pressure regulating valve will close to permit the build-up of the pressure in the wiper motor to drive the piston. As noted above, the amount of compression of the spring will vary directly with the speed at which the motor is set to operate and therefore the spring will permit the pressure regulating valve to open at pressures which are roughly directly proportional to the speed setting of the motor. The foregoing feature is advantageous in that the components of the hydraulic wiper system, including the wiper motor, wiper motor pump, and various conduits therebetween, are therefore subjected only to relatively low pressures most of the time rather than relatively high pressures because the wiper motor is predominantly operated at relatively low speeds and therefore at relatively low pressures. This in turn prolongs the life of the foregoing components, in addition to consuming lesser amounts of power at low speed operation than at high speed operation.

In addition to performing its pressure regulating function noted above, the automatic combined pressure regulating and bypass valve mechanism serves the function of acting as a bypass valve to permit hydraulic fluid coming from the pump to effectively bypass the operating parts of the motor at a relatively low pressure when the motor is in a parked position. More specifically, when the control valve is moved to a parking position, in a direction away from the coupler piston, hydraulic fluid can no longer be routed to the above-mentioned coupler piston which supports one end of the spring. The combined action of moving the control valve away from the coupler piston and of terminating the flow of hydraulic fluid to the coupler piston will permit the spring therebetween to expand and therefore exert a relatively low bias on the combined pressure regulating and bypass valve. Thus the hydraulic fluid coming from the pump will be able to pass through this variable pressure regulating valve which can be opened at a relatively low pressure against the relatively low bias of the spring. When the above control is moved to a motor-running position, the variable pressure regulating valve will again act to regulate pressure and no longer function as a bypass valve in the manner mentioned above. Furthermore, in addition to functioning for both of the above-described functions, the variable pressure regulating valve mechanism is mounted within the motor housing, thereby causing the entire assembly to be relatively compact.

A washer coupler mechanism is supplied on the motor which utilizes a force produced by pneumatic pressure for causing the above-mentioned control valve to move to a motor-running position when a washer system within the vehicle is actuated. Since the control valve in moving to a motor-running position must do so against the bias provided by the above-mentioned spring between the control valve and the coupler piston, when the pneumatic force on the coupler is removed, the spring will expand to return the control valve to a motor-parking position. Thus the spring, in addition to serving in the above-mentioned capacities as an adjunct of the variable pressure regulating system and the bypass system, also serves the function of being a part of the washer system in that it returns the wiper motor to a parked position after the termination of a washing operation.

In accordance with the present invention, a parking arrangement is provided for insuring positive parking of the wiper motor. In this respect the above-mentioned coupler piston which supports one end of the spring has hydraulic pressure supplied to one side thereof when the control valve is moved to a running position. However, a check valve is situated in the line leading to the piston so that the hydraulic fluid which moves the piston cannot escape through the conduit wherein the check valve is situated. Thus, once the pressure is built up behind the piston to compress the spring in the above-described manner, the piston cannot return to its normal parked position until the hydraulic fluid bleeds around the piston back to the exhaust conduit. Since this bleeding takes a relatively long time compared to the time required for one cycle of piston movement, the spring will be compressed for a sufficiently long time to insure a sufficiently high pressure within the motor after the motor has been turned off to insure sufficient pressure until the motor has reached its parked position. By the foregoing arrangement the normal clearance between the piston and the cylinder in which it moves is utilized as a bleed to insure adequate pressure in the motor after the control valve is moved to its parking position, thereby obviating the need for other structure to perform the foregoing function. The present invention will be more fully understood when the following portions of the specification are read in conjunction with the accompanying drawings wherein:

Figure 1:
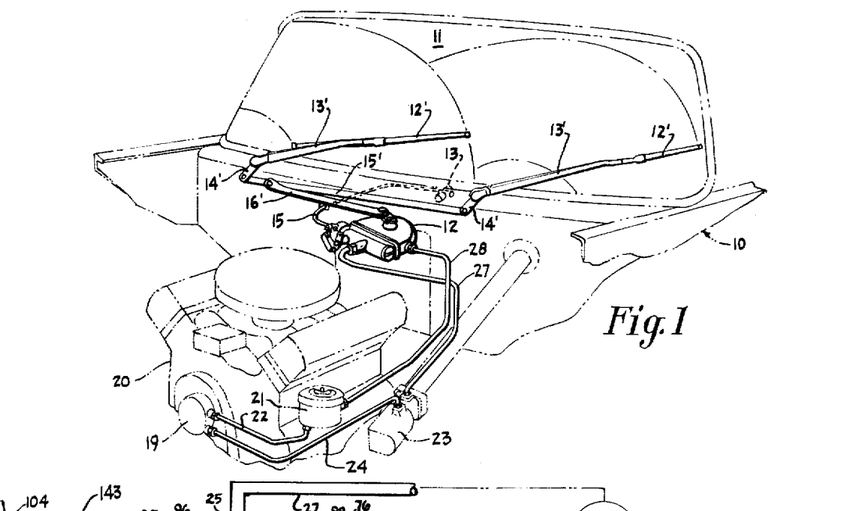
FIG. 1 is a fragmentary perspective view of an automotive vehicle mounting the improved wiper motor of the present invention.
Figure 2:
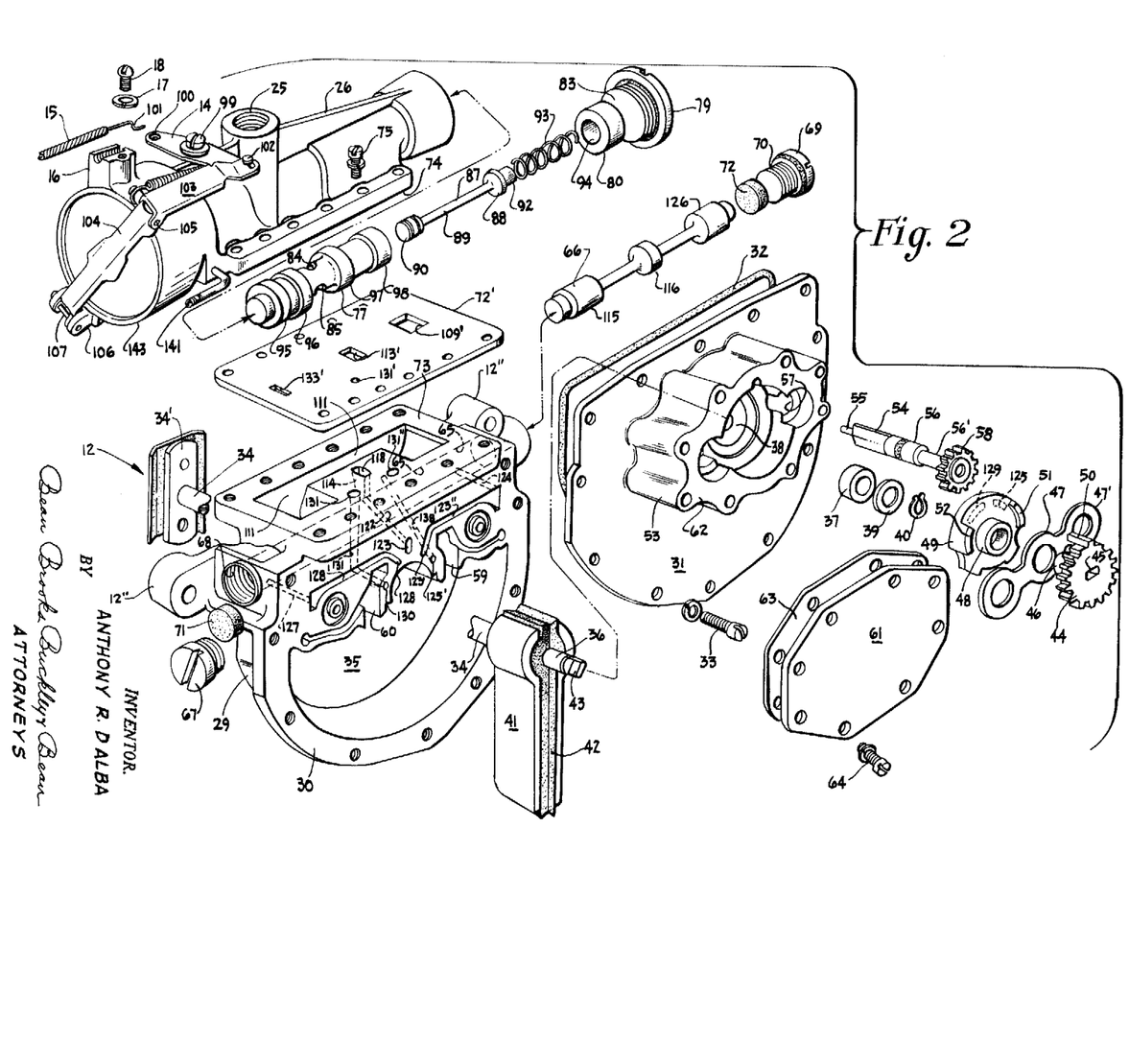
FIG. 2 is an exploded perspective view of the improved wiper motor of the present invention.

In FIG. 1 an automotive vehicle 10 is shown having a windshield 11 mounted thereon in the conventional manner. Suitably mounted on the fire wall of the vehicle, as by the use of lugs 12″, is the hydraulic motor 12 of the present invention. A control 13 is mounted on the vehicle dashboard and is coupled to lever 14 of the wiper motor through a Bowden wire 15, the armor of which is secured to post 16 of the wiper motor by washer 17 secured to said post by screw 18 (FIG. 2). The source of hydraulic fluid for motor 12 is hydraulic pump 19 which is driven directly from vehicle engine 20, pump 19 receiving its supply of hydraulic fluid from reservoir 21 through conduit 22. The high pressure hydraulic fluid is conducted to power steering control valve 23 through conduit 24, and the exhaust from control valve 23 is routed into motor inlet 25 in control housing 26 through conduit 27. The hydraulic fluid then passes through conduit 28 back to reservoir 21 whether the wiper motor is in operation or is parked. The power steering control valve 23 routes hydraulic fluid to a power steering motor (not shown) in response to the manipulation of the vehicle steering wheel, as described in detail in application Serial No. 804,491, over which the present application is an improvement. Whenever wiper motor 12 is in operation, wipers 12′ which are mounted on arms 13′ will be oscillated across the windshield, in view of the fact that the wiper arms are driven from the output of wiper motor 12 through a suitable linkage consisting of links 14′, 15′, and 16′, the foregoing structure being well known in the art.

Figure 9:
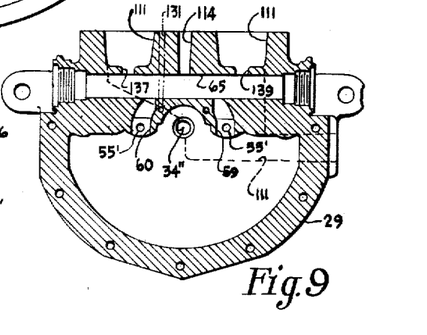
FIG. 9 is a view taken along line IX—IX of FIG. 8.

The wiper motor 12 of the present invention (FIG. 2) includes a housing 29 having rim 30 thereon upon which cover plate 31 is seated, with gasket 32 therebetween, screws 33 securing the foregoing in assembled relationship. A drive shaft 34 has the rear end thereof journaled in a suitable bearing 34″ (FIG. 8) mounted in the rear wall 35 of the motor housing, and the front end 36 thereof journaled in bearing 37 mounted in aperture 38. Mounted to one end of shaft 34 is a universal driver 34′ which is adapted to engage link 16′ for driving the latter. Thrust washer 39 is mounted on the end 36 of shaft 34 and held in position by snap ring 40. Fixedly secured to the intermediate portion of shaft 34 is a drive piston 41, and mounted thereon is a gasket 42 which engages the three walls of the chamber in which the piston is adapted to oscillate. The outer end 43 of the end of shaft 36 is non-circular and receives drive gear 44 thereon, the latter having a mating non-circular aperture 45 to thereby cause gear 44 to rotate in unison with shaft 34. The rear end of gear 44 is formed into a sleeve 46 which mounts the center aperture (not numbered) of spring 47 and also has the sleeve 48 of pilot valve 49 rotatably mounted thereon. A kicker 50 is provided on gear 44 and alternately engages lugs 51 and 52 on pilot valve 49 when the wiper motor is in operation, as will be described in greater detail hereafter. The foregoing assembly is mounted in pilot valve housing 53 which is formed integrally with cover plate 31. Vane 54 has the round end 55 thereof mounted in a suitable bearing 55' in housing 29 (FIG. 9) and also has bearing 56 thereon journaled for rotation in aperture 57 in pilot valve housing 53. Rigidly affixed to the outer end of vane 54 is a gear 58 which is adapted to mesh with gear 44. Spring 47, which takes up the looseness between pilot valve 49 and gear 44, also has a portion 47' which fits around neck 56' of vane 54 to prevent wear of the rear face of gear 58. Vane 56, in operation, alternately opens and closes duct 59 in the motor housing. Another duct 60 has a vane similar to vane 54 mounted therein for the same purpose, the other vane also having a gear in mesh with gear 44. The vanes rotate from a substantially closed position at one end of piston travel through an arc of substantially 180° to a second closed position at the other end of piston travel. Thus the vanes tend to gradually increase the flow of hydraulic fluid into and out of the chambers on opposite sides of motor piston 41 at the beginning of piston travel and tend to restrict the flow of hydraulic fluid into and out of these chambers toward the end of piston travel to thereby provide for piston dampening immediately prior and subsequent to piston reversal. It will be appreciated, of course, that vanes such as 54 do not completely close duct 59 when they are in their closed position, but permit a slight amount of hydraulic fluid to pass by these vanes. A cover plate 61 is secured to rim 62 of pilot housing 53 with a gasket 63 therebetween, such assembly being effected by screws 64 extending through aligned apertures (not numbered).

Housing 29 also contains a shuttle valve chamber 65 therein in which shuttle valve 66 is adapted to oscillate. Chamber 65 constitutes a cylindrical bore having one end thereof plugged by screw 67 which fits into tapped aperture 68, the other end thereof plugged by screw 69 which has a threaded portion 70 thereof received in a suitable tapped aperture. Rubber plugs 71 and 72 are located at the ends of shuttle valve chamber 65 to cushion the shuttle valve at the ends of its travel.

A manifold plate 72' is provided, having apertures 109', 113', 131', and 133' therein. The manifold plate is for the purpose of routing hydraulic fluid through the motor, as will more fully appear at a further point hereafter.

The upper face 73 (FIGS. 2 and 7) of housing 29 receives face 74 on the underside of control housing 26 with manifold plate 72' therebetween, and these elements are secured in assembled relationship by screws 75 extending through a series of aligned apertures in the control housing 26, motor housing 29, and manifold plate 72'. Control housing 26 includes a bore 76 (FIG. 6) in which control valve 77 moves, as described in greater detail hereafter. One end of bore 76 has a plug 78 secured therein as by a press fit. The other end thereof has cap 79 threaded into it to provide a fluid tight closure. A coupler piston 80 is located in chamber 81 which is slightly larger than bore 76. A shoulder 82 (FIG. 6) limits the movement of coupler piston 80 to the left and the face 83 of cap 79 limits the movement thereof to the right. Control valve 77 is hollow and has apertures 84 and 85 therein. Also the end thereof is formed into a conical seat 86. A pressure regulating valve 87 includes a valve 88 for engaging seat 86 on control valve 77.

Furthermore, pressure regulating valve 87 includes a stem 89 and a piston 90, the latter being adapted to ride in bore 91 of control valve 77. A protuberance 92 is located proximate valve 88 for mounting one end of spring 93, the other end thereof being positioned within recess 94 of coupler piston 80. Control valve 77 has lands 95, 96, 97, and 98 thereon for purposes which will be described in detail hereafter when the operation of the motor is discussed.

Figure 6:
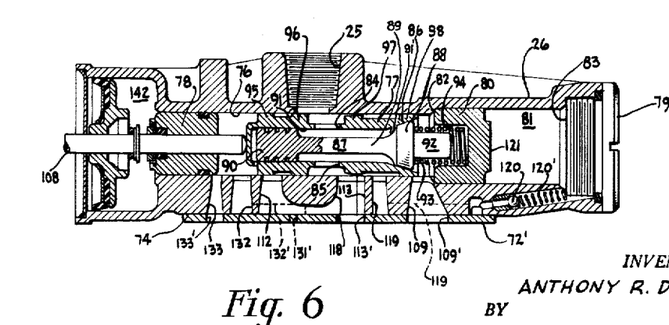
FIG. 6 is a cross sectional view of the control chamber of the motor showing its relationship to the motor manifold plate.

Lever 14 is mounted on control housing 26 by screw 99 and has an aperture 100 therein for receiving the end 101 of Bowden cable 15. The other end of lever 14 has a pin 102 mounted thereon which affixes link 103 to lever 14. The other end of link 103 is pinned to lever 104 by pin 105, lever 104 having the other end thereof pinned to bracket 106 by pin 107. A stem 108 is mounted for reciprocatory movement in plug 78 (FIG. 6). When the Bowden wire 15 moves in response to the manpulation of control 13 to cause lever 104 to move from its position shown in FIG. 3 to its position shown in FIG. 4, stem 108 will move to the right to move control valve 77 from its position shown in FIG. 3 to its position shown in FIG. 4. It is by the manipulation of control 13 that the wiper motor is turned on and off and that its speed is adjusted.

Figure 3:
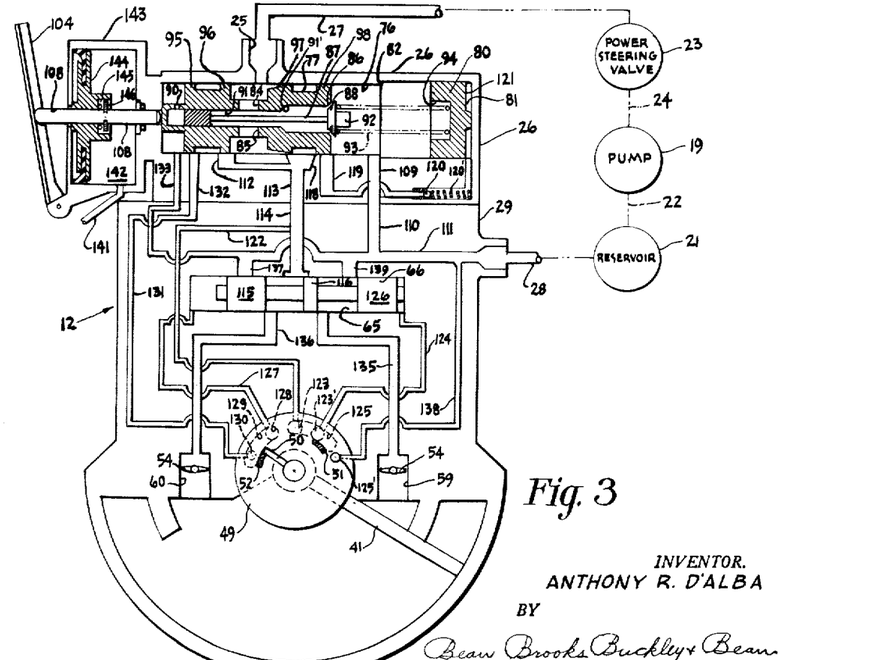
FIG. 3 is a schematic view of the wiper motor of the present invention in its hydraulic circuit, the wiper motor being in a parked position.

When wiper motor 12 is in the parked position shown in FIG. 3, hydraulic fluid passes from the pump to the power steering valve through conduit 24 and then into inlet 25 of control housing 26 through conduit 27. Thereafter the hydraulic fluid passes into the portion of bore 76 between lands 96 and 97, into aperture 84 of control valve 77, through bore 91 of the control valve, past valve 88 which is sufficiently moved away from its seat so as to create a very slight resistance to flow, thence into the portion of bore 76 between valve 88 and coupler piston 80, into conduit 109 in the control housing 26, and then into conduit 110 in the motor housing 29 from which the hydraulic fluid passes into exhaust conduit 111 which is in communication with conduit 28 leading back to the reservoir. Furthermore, the hydraulic fluid passing into the control housing 26 between lands 96 and 97 passes into conduit 112 in the control housing and thence into inlet conduit 113 which is in communication with conduit 114 in the motor housing. Thereafter the hydraulic fluid passes between lands 115 and 116 of shuttle valve 66 and then into conduit 136 which is in communication with duct 60 leading to the motor chamber to the left of piston 41. Spool valve 66 will occupy the position shown in FIG. 3 when the motor is parked, this aspect of the present invention being explained in detail hereafter. It will be noted that the pressure in the chamber to the left of piston 41 is of the magnitude determined by the slight amount of throttling effected by valve 88. This slight pressure is sufficient to maintain piston 41 in the parked position shown in FIG. 3. In the interest of clarity and brevity, manifold plate 72' (FIGS. 2 and 6) will not be referred to in the ensuing portions of the description which refer to the schematic diagrams of FIGS. 3, 4, and 5. It is only necessary to understand that whenever there is flow through certain conduits of control housing 26, there is always a flow through the apertures in manifold plate 72' depicted by corresponding primed numerals.

As explained in detail in the above-mentioned copending application, the combined flow from the pump 19 through the power steering valve 23 and the motor (not shown) associated therewith is also continuous to thereby provide a continuous supply of hydraulic fluid for wiper motor operation. However, as noted above, whenever the wiper motor is not in operation, the flow in the hydraulic circuit will pass through control housing 26 and motor 12 will not provide any appreciable restriction to flow of hydraulic fluid, and therefore will not load pump 19.

Figures 4, 8:
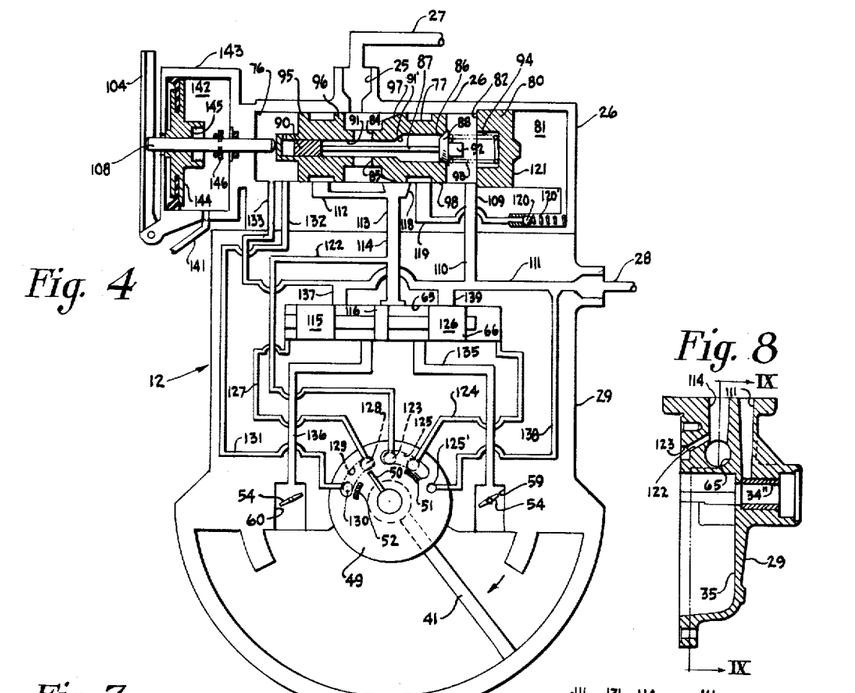
FIG. 4 is a schematic view of the wiper motor of the present invention showing the position which it assumes immediately after it has been started and when the piston is moving in a clockwise direction.
FIG. 8 is a view of the motor taken along line VIII—VIII of FIG. 7.

When it is desired to place the wiper motor 12 in operation, control 13 is manipulated to thereby cause Bowden wire 15 to move lever 104 from the position shown in FIG. 3 to the position shown in FIG. 4 by the intermediate linkage described above. The foregoing movement will cause stem 108 to move from its position shown in FIG. 3 to its position shown in FIG. 4, and control valve 77 will effect a corresponding movement. The hydraulic fluid now entering motor housing 26 (FIG. 4) and passing between lands 96 and 97 is routed into conduit 113 and through the opening 118 into the space between lands 97 and 98 and then into conduit 119, past check valve 120, which is biased toward a closed position by spring 120′, and into chamber 81 on the opposite side of coupler piston 80 from spring 93. The foregoing path is followed by the hydraulic fluid because as control valve 77 was moved to the right from its position shown in FIG. 3 to its position shown in FIG. 4, spring 93 was compressed to therefore provide a greater resistance to valve 88 against opening to permit fluid to bypass it. Furthermore, the hydraulic fluid under increased pressure acting on the face 121 of coupler piston 80 causes it to move from its position shown in FIG. 3 to its position shown in FIG. 4 against the bias of spring 93. This movement was possible because the only force opposing the movement of piston 80 was the bias of spring 93 which was much less than the force of hydraulic fluid on face 121, the hydraulic pressure on the face of coupler piston 80 which is opposite to face 121 being at an exhaust value, near zero, because this other face is in communication with conduit 109 leading to exhaust line 28. In the foregoing manner flow of hydraulic fluid through the wiper motor is restricted to thereby build up pressure for wiper motor operation.

After control valve 77 has been moved to the position shown in FIG. 4, the hydraulic fluid under operating pressure will pass from conduit 113 into conduit 114, then into conduit 122 leading to aperture 123. Pilot valve 49 will be in the position shown in FIGS. 3 and 4 and thereby permit the high pressure hydraulic fluid in conduit 122 to pass into conduit 124 through the groove 125 in the pilot valve. Conduit 124 is in communication with the chamber to the right of land 126 of shuttle valve 66. Thus the high pressure will move shuttle valve 66 to the left, especially since there is no pressure opposing such movement because the chamber to the left of land 115 is in communication with the exhaust line 28 through conduit 127, aperture 128, pilot valve groove 129, aperture 130, conduit 131 in the motor housing 29, conduit 132 of the control housing 26, the portion of bore 76 to the left of land 95, and conduit 133 which is in communication with exhaust conduit 111 leading to conduit 28 which is in communication with reservoir 21.

The movement of shuttle valve 66 to the position shown in FIG. 4 will cause high pressure fluid to be routed from conduit 114 to the chamber to the right of motor piston 41, through the portion of shuttle valve chamber 65 between lands 126 and 116, conduit 135, and duct 59. The movement of piston 41 in a clockwise direction will be effected because the hydraulic fluid in the chamber to the left of piston 41 is in communication with exhaust conduit 111 through duct 60, conduit 136, the portion of shuttle valve chamber 65 between lands 115 and 116, and conduit 137. The foregoing clockwise movement of piston 41 will continue until reversal is effected by kicker 50 engaging lug 51 on shuttle valve 49 and causing the shuttle valve to move from its position in FIG. 4 to the position shown in FIG. 5.

Figure 5:
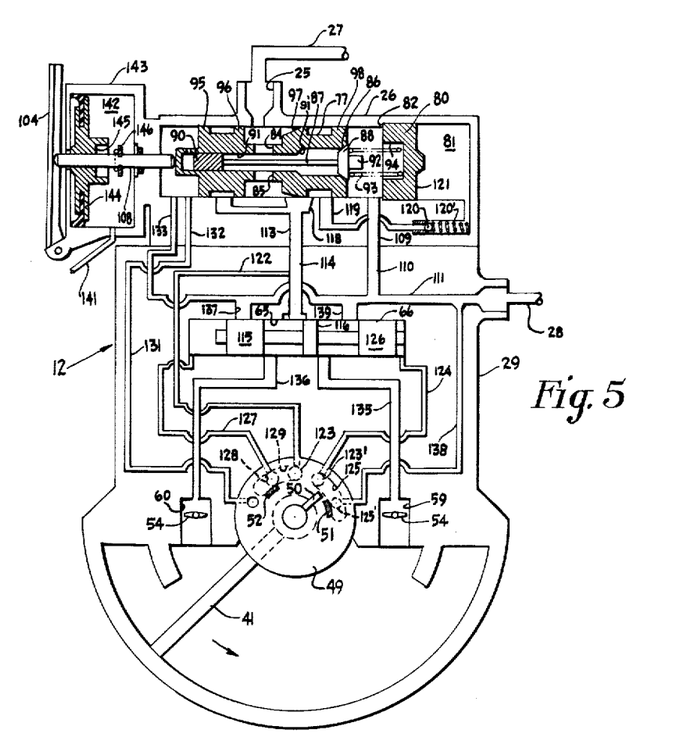
FIG. 5 is a schematic view showing the position of the parts of the motor after piston reversal and when the piston is moving in a counterclockwise direction.

From FIG. 5 it can be seen that after pilot valve 49 has been rotated in a clockwise direction by kicker 50, shuttle valve 66 will move from the position shown in FIG. 4 to the position shown in FIG. 5 because the portion of the shuttle valve chamber to the right of land 126 is in communication with exhaust conduit 111 through conduit 124, aperture 123′, pilot valve groove 125, aperture 125′, and conduit 138, and because the shuttle valve chamber 65 to the left of land 115 is in communication with high pressure conduit 114 through conduit 122, aperture 123, pilot valve groove 129, aperture 128, and conduit 127. When shuttle valve 66 assumes the foregoing position, high pressure hydraulic fluid will pass to the chamber to the left of piston 41 through conduit 114, the portion of shuttle valve chamber 65 between lands 115 and 116, conduit 136, and duct 60. Furthermore, the low pressure hydraulic fluid in the chamber to the right of piston 41 will be exhausted into conduit 111 through duct 59, conduit 135, the portion of shuttle valve chamber 65 between lands 116 and 126, and conduit 139. Because of the foregoing unbalance of pressures on opposite sides of piston 41, the latter will move in a counterclockwise direction. Toward the end of piston travel, kicker 50 will engage lug 52 of pilot valve 49 and return it to the position shown in FIG. 4, and such movement of the pilot valve will return shuttle valve 66 to the position shown in FIG. 4, as described in detail above, to thereby cause piston 41 to move in a clockwise direction, as also described in detail above.

As mentioned above and as fully described in copending application Serial No. 804,491, the meshing engagement between gear 44 mounted on rockshaft 34 and gears 58, mounted integrally with vanes 54, causes the flow of hydraulic fluid into the motor to be greatly restricted toward each end of piston travel. This action tends to cause the hydraulic pressure in the conduits leading to the high pressure side of piston 41 to rise. When this pressure tends to rise above the bias of spring 93 tending to keep valve 88 in position on its seat 86, valve 88 will tend to open and therefore reduce the build up of pressure. Thus valve 88 acts to regulate the pressure of hydraulic fluid being supplied to the wiper motor and in so doing tends to maintain this pressure at a substantially constant value irrespective of changes in flow of hydraulic fluid within the motor itself. At this juncture it is to be especially noted that the amount of compression of spring 93 which acts on pressure regulating valve 88 depends on the position of control valve 77. More specifically, whenever the wiper motor is in operation, coupler piston 80 will always occupy the positions shown in FIGS. 4 and 5, that is, it will move from its position shown in FIG. 3 to the left until it reaches the positions shown in FIGS. 4 and 5, where its leftward movement is stopped by shoulder 82. The foregoing will occur under all conditions of motor operation regardless of the position of control valve 77. It can readily be seen, however, that if control valve 77 is moved only slightly to the right from its off position shown in FIG. 3 that a very slight amount of hydraulic fluid will be admitted into opening 118 for driving the wiper motor, and that the more control valve 77 is moved to the right, the greater will be the amount of opening 118 uncovered by land 97 to admit more fluid to the wiper motor. However, the more that control valve 77 is moved to the right, the greater will be the compression of spring 93, and thus the greater will be the biasing force tending to maintain pressure regulating valve 88 seated. In other words, the greater the speed setting of control valve 77 which accompanies its movement to the right, the greater will be the biasing force of spring 93 tending to cause pressure regulating valve 88 to remain seated. The significance of the foregoing is that when the wiper motor is set for a relatively low speed, spring 93 will be under relatively low compression, and therefore valve 88 will be unseated, at piston reversal, at a relatively low hydraulic pressure within the wiper motor. On the other hand, when control valve 77 is set for providing high speed wiper motor operation, spring 93 will be under a relatively great compression and will only permit control valve 88 to be unseated at higher pressures than when spring 93 was under relatively little compression. The practical significance of the foregoing is that when the wiper motor is set to operate for relatively low speed operation, as it is under most conditions of wiper motor use, the wiper motor will provide a relatively low load on the pump which supplies hydraulic fluid thereto. Furthermore, it is only during the times that the wiper motor is set to operate at its maximum speeds, as during heavy rainstorms, that the motor will operate at a relatively high pressure and provide its maximum loading on the pump. Thus during most of the time that the wiper motor is used, the entire system is loaded at a relatively low pressure and it is only when the wiper motor is set for high speed operation that the wiper system is subjected to relatively high pressures.

It can thus be seen that valve 88, in addition to providing the pressure regulating function described immediately above, also performs the additional function of permitting hydraulic fluid under a relatively low pressure to bypass the wiper motor when the latter is in its parked position, as also described in detail above.

When it is desired to park the wiper motor, control 13 (FIG. 1) is manipulated to cause lever 104 to return to its position shown in FIG. 3. Since a high pressure still exists in chamber 81 on the face 121 of coupler piston 80, the latter will remain in the position shown in FIGS. 4 and 5 and cause spring 93 to be under compression. The compressed spring in combination with the unbalance of pressure within bore 91 acting on face 91' of valve 77 will cause control valve 77 to move from its position shown in FIGS. 4 and 5 to its position shown in FIG. 3. Assuming that piston 41 is traveling in a counterclockwise direction (FIG. 5) when the above occurs, shuttle valve 66 will continue to occupy the position shown in FIGS. 5 and 3. This will permit high pressure hydraulic fluid to be supplied to the left of piston 41 through the following path, as seen from FIG. 3, namely, the space between control valve lands 96 and 97, conduit 112, conduit 113, conduit 114, the space between lands 116 and 115 of shuttle valve 66, conduit 136, and duct 60. Low pressure hydraulic fluid will be exhausted from the space to the right of piston 41 through duct 59, conduit 135, the space between lands 116 and 126 of shuttle valve 66, conduit 139 and exhaust 111. Slightly before the time that piston 41 reaches its parked position shown in FIG. 3 the kicker 50 will engage lug 52 of pilot valve 49 and move the latter from its position shown in FIG. 5 to its position shown in FIG. 3. This will cause high pressure hydraulic fluid to be supplied to both the shuttle valve chamber 65 to the right of land 126 and to the left of land 115 in the following manner, and since these pressures tending to move shuttle valve 66 in opposite directions are equal, the latter will remain in its position shown in FIGS. 5 and 3. More specifically, after control valve 77 has returned to its position shown in FIG. 3, high pressure hydraulic fluid which exists between lands 96 and 97 of the control valve will pass from conduit 112 into the space between lands 96 and 95 of the control valve and then into conduit 132, conduit 131, through aperture 130, groove 129 of pilot valve 49, aperture 128, and conduit 127 to the chamber to the left of land 115. The same high pressure which exists in the space between lands 96 and 97 of control valve 77 also passes to the portion of shuttle valve chamber 65 to the right of land 126 by passing through conduits 113, 114, and 122, aperture 123, pilot valve groove 125, aperture 123', and conduit 124. Thus since the shuttle valve is held in the position in which it was before the pilot valve 49 was moved by kicker 50, piston 41 will remain in the position shown in FIG. 3 after it has reached this position at the termination of its counterclockwise movement.

It is to be especially noted that in order for piston 41 to return to its position shown in FIG. 3, as described above, the pressure in the wiper motor chamber to the left of piston 41 must remain at a relatively high value until parking is completed. The foregoing is achieved by virture of the fact that hydraulic fluid at high pressure continues to be exerted on the face 121 of coupler piston 80 after control valve 77 has moved to its position shown in FIG. 3, the foregoing orientation causing sufficient compression in spring 93 to maintain pressure regulator valve 88 seated on its seat 86 with sufficient pressure to maintain high pressure in the wiper motor. After parking has been completed, the hydraulic fluid at high pressure in chamber 81 to the right of coupler piston face 121 bleeds down through the clearance between the inside walls of chamber 81 and the outside of coupler piston 80. The hydraulic fluid which thus bleeds passes into the chamber in which spring 93 is housed and then into conduit 109 which is in communication with exhaust conduit 111 through conduit 110. As the high pressure fluid on face 121 of coupler piston 80 thus bleeds from chamber 81, coupler piston 80 will move to the right as compressed spring 93 expands. At the termination of expansion of spring 93, coupler piston 80 will occupy the position shown in FIG. 3, and spring 93 will be under its least amount of compression and thus permit valve 88 to act as a bypass for preventing the exertion of a load on pump 19 when wiper motor 12 is not in operation.

If control valve 77 is moved to its position shown in FIG. 3 when motor piston 41 is moving in a clockwise direction shown in FIG. 4, parking of the wiper motor occurs in the following manner. Piston 41 will continue its clockwise movement because high pressure hydraulic fluid is supplied thereto after control valve 77 has moved to its position shown in FIG. 3 through conduits 112, 113, and 114, the portion of shuttle valve chamber 65 between lands 116 and 126, conduit 135, and duct 59. Low pressure hydraulic fluid is exhausted from the left of piston 41 through duct 60, conduit 136, the space between lands 115 and 116, conduit 137, and exhaust conduit 111. Furthermore, when pilot valve 49 is in the position shown in FIG. 4, and control valve 77 is in the position shown in FIG. 3, and shuttle valve 66 is in the position shown in FIG. 4, high pressure hydraulic fluid will be supplied to the portion of shuttle valve chamber 65 to the left of land 115 through conduits 132 and 131, pilot valve groove 129, and conduit 127. Furthermore, high pressure hydraulic fluid will be supplied to the portion of shuttle valve chamber 65 to the right of land 126 through conduit 122, pilot valve groove 125, and conduit 124. Thus when piston 41 is traveling in a clockwise direction, since shuttle valve 66 will have moved to the position shown in FIG. 4 before control valve 77 was manipulated, shuttle valve 66 will remain in the position shown in FIG. 4 while piston 41 is traveling in a clockwise direction. The reason for the foregoing is that previous to the movement of control valve 77 to a parking position, the high pressure existed only in the portion of shuttle valve chamber 65 to the right of land 126, as described in detail above, and the moving of control valve 77 to a parking position merely caused the supplying of hydraulic fluid at high pressure to the portion of shuttle valve chamber 65 to the left of land 115. This equalizing of hydraulic pressure at opposite ends of the shuttle valve 66 permits it to remain in the position it occupied before such pressures were balanced. After piston 41 has completed its clockwise movement, kicker 50 will return shuttle valve 49 to the position shown in FIG. 5. This will permit the portion of shuttle valve chamber 65 to the right of land 126 to be exhausted through conduit 124, shuttle valve groove 125, and conduit 138. However, the portion of shuttle valve chamber 65 to the left of land 115 is in communication with the high pressure fluid between control valve lands 96 and 97 through conduits 132 and 131, pilot valve groove 129, and conduit 127. This will cause shuttle valve 66 to move from its position shown in FIG. 4 to its position shown in FIG. 3. However, since piston 41 is now moving in a counterclockwise direction, the parts of the wiper motor are oriented as described above with respect to the time when the control valve was moved to a parking position while piston 41 was moving in a counterclockwise direction and, as described above, after piston 41 reaches its limit of counterclockwise travel, the wiper motor will stop and the pressure in chamber 81 in which coupler piston 80 moves will dissipate, as also described above.

Further in accordance with the present invention, the spring 93, which controls the pressure at which the wiper motor will operate in accordance with the setting of control valve 77, also acts to return control valve 77 to a parked position after a windshield washing operation. In this respect, a vacuum coupling nipple 141 is provided for attachment with a hose coming from a vacuum source, nipple 141 being in communication with chamber 142 of coupler 143. When a washer control is actuated to start a windshield washer (not shown), chamber 142 will be placed in communication with a source of vacuum to cause piston 144 to move to the right. The hub 145 of piston 144 will effectively engage washer 146, which is secured to shaft 108, and will thus cause control valve 77 to move from its position shown in FIG. 3 to its position shown in FIGS. 4 and 5. After washer operation has terminated so that cleaning solvent is no longer projected on the windshield and after a suitable dry wipe cycle has been effected to clear moisture from the windshield, in a manner which is well known in the art, the control which placed chamber 142 of coupler 143 in communication with the source of vacuum will be vented and there will no longer be a force tending to bias control valve 77 to the right. Thus spring 93 will be permitted to expand to return control valve 77 to the position shown in FIG. 3 to thereby cause wiper motor operation to terminate in the manner fully described above.

It is to be noted that apertures 128 and 123', shown in schematic FIGS. 3, 4, and 5, are actually the ends of grooves 128' and 123" shown in FIG. 2, which are in communication with conduits 127 and 124, respectively, in housing 29. Grooves 128' and 123" combine with the rear face of cover 31 to act as conduits to conduct hydraulic fluid in response to the action of pilot valve 49, as described above.

Furthermore, while exhaust conduit 111 is depicted only as a conduit within housing 29 in schematic FIGS. 3, 4, and 5, it can be seen from FIGS. 2, 7, 8, and 9 that conduit 111 is actually an exhaust manifold, and that the underside of manifold plate 72' serves as a wall of exhaust manifold 111. Furthermore, from FIGS. 2, 6, and especially 7, it can be seen that the surface of manifold plate 72' functions as a wall of conduit 119, the latter being formed by the combination of a portion of manifold plate 72' and a groove in the undersurface of control housing 26.

Figure 7:
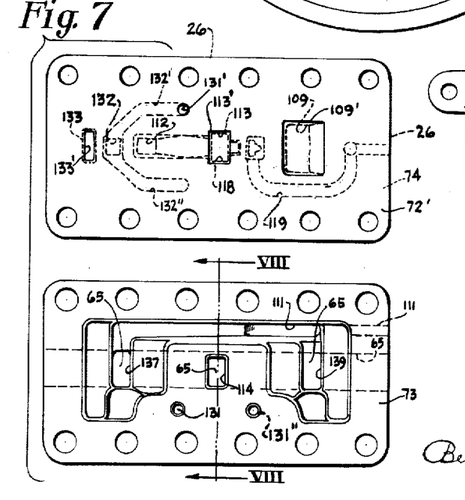
FIG. 7 is an open-faced view showing the porting in the bottom of the control chamber which is adapted to mate with the top of the motor housing, the manifold plate being shown in overlying relationship with the bottom of the control chamber.

From FIG. 7 it can be seen that the undersurface 74 of control housing 26 has shallow ducts 132' and 132" in communication with conduit 132 (FIG 6) of control housing 26. When surfaces 73 and 74 are in assembled relationship with manifold plate 72' therebetween, conduit 131 of housing 29 is actually in communication with duct 132' through aperture 131' of the manifold plate. (The direct communication between conduits 131 and 132 (schematic FIGS. 3, 4, and 5) actually does not exist, but was merely set forth in the schematic diagrams in the interest of brevity and clarity.)

Manifold plate 72', noted above, cooperates with control housing 26 to permit the wiper motor to park in the position shown in FIG. 3 when it and control housing 26 are oriented on wiper motor housing 29, as shown in the drawings, or permits the wiper motor to park with its drive piston 41 at the extreme limit of clockwise movement when control housing 26 and manifold plate 72' are reversed on housing 29. After such reversal, aperture 133' of manifold plate 72' and conduit 133 of control housing 26 will overlie duct 139 of housing 29; and duct 109 of control housing 26 and aperture 109' of manifold plate 72' will overlie duct 137 of housing 29 (FIG. 7). Furthermore, if the reversed parking noted above is to be effected, conduit 131 (FIG. 6) is plugged, and a similar conduit 131" is opened in housing 29 to communicate with aperture 125'. In other words, conduits 131 and 138 in housing 29 are reversed as to location. After such reversal of control housing 26 and manifold plate 72' has been effected to obtain opposite parking, conduit 131" (FIG. 7) communicates with conduit 132 of control housing 26 through aperture 131' in manifold plate 72' and groove 132" in control housing 26.

It can thus be seen that by the use of motor housing 29, control housing 26, and manifold plate 72' in the above manner, a right-hand park or a left-hand park type of motor can be fabricated. Furthermore, it is to be noted that manifold plate 72' performs a function of routing hydraulic fluid in a dual manner, namely, through the apertures therein and in view of the cooperation between the flat side surfaces thereof with grooves such as 132', 132", and 119 in control housing 26, as well as in cooperation with exhaust manifold 111.

It can thus be seen that the wiper motor of the present invention is manifestly capable of achieving the above enumerated objects, and while a preferred embodiment of the present invention has been described, it is to be understood that the present invention is not to be limited thereto, but may be otherwise embodied within the scope of the following claims.

What is claimed is:

1. An hydraulic windshield wiper motor comprising a housing, a piston mounted for reversible movement in said housing, said piston dividing a portion of said housing into first and second chambers, first conductor means in communication with said first chamber and second conduit means in communication with said second chamber, a fluid inlet conduit in said housing, a shuttle valve for alternately placing said first and second chambers in communication with said fluid inlet conduit through said first and second conduit means, respectively, while permitting the fluid in the other of said chambers to be exhausted, pilot valve means operable in synchronism with movement of said piston for causing said shuttle valve to move back and forth to effect said alternate communication of said fluid inlet conduit with said first and second chambers, control means for setting the speed of said motor, and variable pressure regulating means responsive to said control means and to excessive motor pressure for causing the magnitude of the hydraulic pressure in said fluid inlet conduit to vary directly with the speed setting of said motor.

2. An hydraulic windshield wiper motor comprising a housing, a piston mounted for reversible movement in said housing, said piston dividing a portion of said housing into first and second chambers, first valve means and conduits for alternately routing pressurized hydraulic fluid to said first and second chambers while permitting the fluid in the other of said chambers to be exhausted, control means movable to different settings for adjusting the operating speed of said motor, and variable pressure regulating means automatically responsive to the speed setting of said control means for causing the magnitude of the pressure of the hydraulic fluid supplied to said motor to vary directly with the speed of said motor.

3. An hydraulic windshield wiper motor as set forth in claim 2 wherein said control means comprises second valve means for metering hydraulic fluid from a fluid pressure source into said motor for driving said piston and wherein said variable pressure regulating means includes third valve means and biasing means for tending to bias said third valve means to a closed position against the pressure exerted by said hydraulic fluid, said third valve means being adapted to open when the pressure of said hydraulic fluid exceeds the biasing force exerted by said biasing means, and means operatively interconnecting said control means and said biasing means for causing said biasing means to effect a greater biasing force on said third valve means against opening when said control means are set for high speed motor operation than when said control means are set for low speed motor operation.

4. An hydraulic windshield wiper motor as set forth in claim 3 wherein said variable pressure regulating means are located within said housing, and wherein conduit means are provided in said housing and are associated with said variable pressure regulating means and said control means for permitting hydraulic fluid to bypass the operating parts of said wiper motor when said control means are in a motor parking position, said variable pressure regulating means automatically causing a much smaller pressure drop across said motor when said control means are in a parking position than when said control means are in a position which causes the motor to operate.

5. An hydraulic windshield wiper motor as set forth in claim 4 wherein said third valve means include a seat on said control means, and said control means include a hollow portion through which hydraulic fluid bypassing said motor travels when said third valve means are moved away from said seat by the force exerted by hydraulic fluid under pressure acting on said third valve means against the force exerted by said biasing means.

6. An hydraulic windshield wiper motor comprising a housing, piston means dividing a portion of said housing into first and second chambers, a shuttle valve chamber, a shuttle valve movable back and forth in said shuttle valve chamber, a fluid inlet conduit in communication with said shuttle valve chamber, a first fluid conduit extending between said shuttle valve chamber and said first chamber, a second fluid conduit extending between said shuttle valve chamber and said second chamber, a pilot valve operable in synchronism with the movement of said piston means for routing hydraulic fluid to said shuttle valve chamber to thereby cause said shuttle valve to cause said fluid inlet conduit to alternately communicate with said first and second chambers through said first and second conduits, respectively, while permitting the other of said conduits to alternately evacuate the chamber with which it is in communication through said shuttle valve chamber, a control valve chamber in said housing, a control valve movable in said control valve chamber for metering hydraulic fluid to said fluid inlet conduit, a seat on said control valve, a pressure relief valve adapted to seat on said seat, spring means for normally biasing said pressure relief valve to a closed position on said seat while said motor is in operation but permitting said pressure relief valve to unseat and thereby cause said hydraulic fluid to effectively bypass said fluid inlet conduit when the pressure of said hydraulic fluid exceeds the biasing force of said spring means, means for locating a first end of said spring means at a given position within said housing when said motor is in operation, the position of said control means determining the position of a second end of said spring means whereby the biasing force exerted by said spring means varies with the position of said control valve whereby said pressure relief valve will release at relatively low hydraulic pressures when said control valve is set for relatively low speed operation and will release at relatively high pressures when said control valve is set to provide relatively high speed operation, and means operatively associated with said means for positioning said first end of said spring means more remotely from said pressure relief valve when said control valve is placed in a parking position than the position which it occupies when said motor is in operation to thereby permit a much lesser hydraulic pressure to maintain said pressure relief valve off of its seat when said motor is parked than when it is in operation whereby said pressure relief valve functions to permit hydraulic fluid to bypass said wiper motor when it is parked and causes the pressure drop across the wiper motor when it is parked to be less than the pressure drop across said wiper motor when it is in operation.

7. An hydraulic windshield wiper motor comprising a housing, piston means dividing a portion of said housing into first and second chambers, an inlet conduit in said housing, a shuttle valve chamber in communication with said inlet conduit, a first conduit extending between said shuttle valve chamber and said first chamber, a second conduit extending between said shuttle valve chamber and said second chamber, pilot means operable in synchronism with the movement of said piston means for causing said shuttle valve to move back and forth and thereby alternately route hydraulic fluid from said inlet conduit to said first and second chambers through said first and second conduits, respectively, while permitting hydraulic fluid in the other of said chambers to be exhausted therefrom through the conduit in communication therewith, a control valve for metering hydraulic fluid from a source of hydraulic fluid under pressure to said inlet conduit, and valve means in said housing for permitting hydraulic fluid under pressure to effectively bypass said inlet conduit when said control valve is in a position which causes said wiper motor to assume a parked position and when the pressure of said hydraulic fluid exceeds a predetermined value while said hydraulic motor is in operation.

8. An hydraulic windshield wiper motor comprising a housing, a piston mounted for reversible movement in said housing, said piston dividing a portion of said housing into first and second chambers, valving means and conduits for alternately routing pressurized hydraulic fluid to said first and second chambers while permitting the fluid in the other of said chambers to be exhausted, a fluid inlet conduit in said motor, a control valve movable to different settings for adjusting the speed of operation of said motor by metering the amount of hydraulic fluid supplied to said fluid inlet conduit, a variable pressure regulating valve mounted for movement with said control valve, coupler piston means, spring means extending between said coupler piston means and said variable pressure regulating valve, conduit means for causing pressurized hydraulic fluid to move said coupler piston means and thus compress said spring means when said control valve is moved to a motor operating position whereby said spring means bias said variable pressure regulating valve into a closed position on said control valve, the amount of compression of said spring means being determined by the position of said control valve whereby the pressure at which said variable pressure regulating valve will open is proportional to the amount of metering effected by said control valve, said variable pressure regulating valve unseating against the bias of said spring means to permit hydraulic fluid to bypass said fluid inlet conduit when the fluid pressure to said motor exceeds the biasing force of said spring means, and bleed means for permitting the pressurized hydraulic fluid utilized to move said piston means to bleed at a controlled rate and thereby permit said spring means to expand and thereby exert a lesser force on said variable pressure regulating valve after said control valve is moved to a motor parking position, said controlled rate of bleeding permitting sufficient pressure to be maintained within said fluid inlet conduit for a sufficient time to assure positive parking of said motor, said spring means after expansion thereof due to the bleeding of said pressurized hydraulic fluid exerting a relatively light force on said variable pressure regulating valve whereby said variable pressure regulating valve functions as a bypass producing a relatively small pressure drop across said motor when said control valve is in a parked position.

References Cited in the file of this patent

UNITED STATES PATENTS

| | | |
|---|---|---|
| 2,450,564 | Sacchini | Oct. 5, 1948 |
| 2,802,232 | Oishei et al. | Aug. 13, 1957 |
| 2,890,715 | Ebersold | June 16, 1959 |
| 2,942,585 | Oishei et al. | June 28, 1960 |
| 2,970,336 | Webb | Feb. 7, 1961 |
| 3,005,222 | Webb | Oct. 29, 1961 |

UNITED STATES PATENT OFFICE
CERTIFICATE OF CORRECTION

Patent No. 3,100,423 August 13, 1963

Anthony R. D'Alba

It is hereby certified that error appears in the above numbered patent requiring correction and that the said Letters Patent should read as corrected below.

Column 12, line 29, for "conductor" read -- conduit --.

Signed and sealed this 31st day of March 1964.

(SEAL)
Attest:
ERNEST W. SWIDER

Attesting Officer

EDWARD J. BRENNER

Commissioner of Patents